United States Patent [19]

Sauer et al.

[11] Patent Number: 4,548,797
[45] Date of Patent: Oct. 22, 1985

[54] PROCESS OF REMOVING POLLUTANTS FROM EXHAUST GASES

[75] Inventors: Harald Sauer; Hans-Werner Schmidt, both of Frankfurt am Main; Wolfgang Fennemann, Karben, all of Fed. Rep. of Germany

[73] Assignee: Metallgesellschaft Aktiengesellschaft, Frankfurt, Fed. Rep. of Germany

[21] Appl. No.: 534,839

[22] Filed: Sep. 22, 1983

[30] Foreign Application Priority Data

Sep. 25, 1982 [DE] Fed. Rep. of Germany ....... 3235558

[51] Int. Cl.$^4$ .................. C01B 7/00; B01D 31/02
[52] U.S. Cl. .................. 423/240; 423/244; 423/DIG. 16; 55/6; 55/71; 55/73
[58] Field of Search .......... 423/659, DIG. 16, 244 A, 423/240 S, 244 R; 55/99, 131, 136, 137, 479

[56] References Cited

U.S. PATENT DOCUMENTS

| | | | |
|---|---|---|---|
| 2,631,921 | 3/1953 | Odell | 423/DIG. 16 |
| 3,907,971 | 9/1975 | Böhm et al. | 423/240 S |
| 4,041,141 | 9/1977 | Moss | 423/DIG. 16 X |
| 4,076,796 | 2/1978 | Reh et al. | 423/DIG. 16 |
| 4,116,814 | 9/1978 | Zahner | 423/DIG. 16 X |
| 4,120,645 | 10/1978 | Heian et al. | 423/244 A X |
| 4,154,581 | 5/1979 | Nack et al. | 423/244 A X |
| 4,177,158 | 12/1979 | Blue | 423/244 A X |
| 4,329,324 | 5/1982 | Jones | 423/244 A |
| 4,389,381 | 6/1983 | Dinovo | 423/DIG. 16 X |
| 4,442,079 | 4/1984 | Donelly et al. | 423/244 A X |
| 4,457,896 | 7/1984 | Kono | 423/659 |

FOREIGN PATENT DOCUMENTS

| | | | |
|---|---|---|---|
| 3018743 | 11/1981 | Fed. Rep. of Germany . | |
| 3041997 | 6/1982 | Fed. Rep. of Germany . | |
| 1395211 | 5/1975 | United Kingdom | 423/240 S |
| 1416344 | 12/1975 | United Kingdom | 423/240 S |
| 1504688 | 3/1978 | United Kingdom . | |

Primary Examiner—Donald R. Valentine
Attorney, Agent, or Firm—Felfe & Lynch

[57] ABSTRACT

A process of removing pollutants from exhaust gases in a circulating fluidized bed, in which solids are circulated through a fluidized bed reactor, separated in a separator and returned via a return line, to the reactor. The exhaust gas is introduced as a fluidizing gas into a fluidized bed which consists of two solid fractions differing in particle size, namely, a coarse-grained fraction having a particle size $d_p$ 50 in the range of 150 to 500 microns and a fine-grained fraction having a particle size $d_p$ 50 below 10 microns.

12 Claims, 1 Drawing Figure

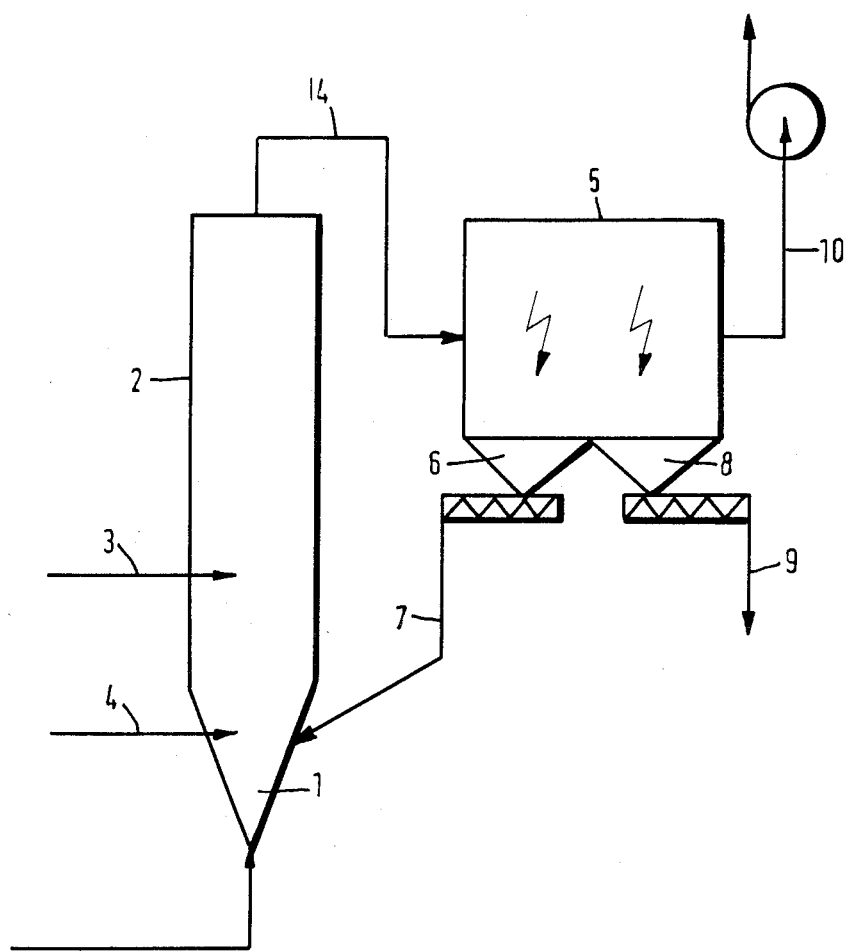

PROCESS OF REMOVING POLLUTANTS FROM EXHAUST GASES

BACKGROUND OF THE INVENTION

This invention relates to a process of removing pollutants from exhaust gases by means of solids in a circulating fluidized bed which are circulated through a fluidized bed reactor, a separator, and a return line.

The flue gases produced by the combustion of fossil fuels may contain oxides of sulfur, particularly sulfur dioxide, in substantial proportions, which depend on the sulfur content of the starting materials. The exhaust gases produced by the continually increasing number of refuse incinerating plants also contain sulfur oxides and as a result of the combustion of plastic materials, which are virtually always present, contain hydrogen chloride and hydrogen fluoride as additional impurities. Pursuant to the regulations for the protection of the environment, such impurities must be removed from the exhaust gases before these are discharged into the atmosphere.

By far the largest number of processes of purifying exhaust gases comprise a wet scrubbing step for removing the above-mentioned impurities and use mainly solutions or suspensions of substances which react with the pollutants (Ullmann's Encyklopädie der Techn. Chemie, 3rd edition, Vol. 2/2, 1968, page 419).

Other processes comprise a dry scrubbing of the gases, wherein the gases are passed through a fixed bed of particulate solids, such as activated carbon or brown coal coke, which react with the impurities. Exhaust gases can also be purified by means of a so-called traveling bed, in which the solids are increasingly laden as they descend in the reactor and the solids are finally discharged. Fresh material at a rate corresponding to the discharge rate is fed to the upper portion of the reactor (Meier zu Köcker "Beurteilung und Aussichten von Verfahren zur Rauchgasentschwefelung"; V.G.B. Kraftwerkstechnik 53 (1973), pages 516 et seq.).

In another known process, sulfur oxides, e.g., are removed from gases in that absorbents are pneumatically introduced into the gases, the resulting gas-solid dispersion is pneumatically conveyed through a reaction zone and then through a residence zone, and the solids are subsequently separated from the gas. After certain regenerating steps, a partial stream of solids is finally recycled to the cleaning step (U.S. Pat. No. 3,485,014).

Another known system for a dry removal of pollutants from flue gases follows the combustion zone in the direction of flow of the flue gases in a region where the flue gases are at a temperature of 700° to 900° C. That system comprises a fluidized bed which occupies the entire cross-section of flow of the flue gases, and/or a circulating fluidized bed, and said fluidized bed is fed with an adsorbent consisting of calcium carbonate or magnesium carbonate (Laid-open German Application No. 3009366). The perforated bottom of the fluidized bed reactor is suitably cooled.

Wet scrubbing processes have the serious disadvantage that the formed sludge contains sulfites, sulfates and possibly also chlorides and fluorides, is difficult to discard and the purified exhaust gases must be reheated. The disadvantages of the known dry scrubbing processes using a fixed or traveling bed reside in that the absorbents are coarse-grained so that their capacity to bind the impurities contained in the exhaust gas is utilized only to a very low degree. Due to the high rate of gas to be purified and the relatively low permissible gas velocity, reactors of considerable size are required.

The important disadvantages of the process according to U.S. Pat. No. 3,485,014 reside in that the gas stream to be purified must be divided and the absorbent must be precisely proportioned in suitable equipment which must be wear-resistant. Another disadvantage is that the residence time of the gases in the reaction zone is too short for an adequate removal of the impurities thus requiring a reactor having a considerable overall height.

In the removal of pollutants from the flue gases at 700° to 900° C. in accordance with Laid-open German Application No. 3009366, difficulties are involved in that special measures and alterations of the furnace are required in order to adjust the flue gases to a temperature in the range of 700° to 900° C. because the flue gases are usually at a higher temperature as they leave the combustion chamber and at a lower temperature as they leave the waste heat boiler.

In connection with a special operation of removing hydrogen fluoride from exhaust gases, particularly from exhaust gases formed in the electrolytic production of aluminum, it is known to supply the hydrogen fluoride-containing gases as a fluidizing gas to a fluidized bed reactor and to control the velocity of the fluidizing gas in such a way that a circulating fluidized bed is formed which is circulated through the fluidized bed reactor, a succeeding cyclone separator and a return line (Laid-open German Application No. 2056096). It has been mentioned that the solids used to form the circulating fluidized bed may consist of alumina and/or sodium aluminate and are recycled to the electrolytic cell.

The above-mentioned process is not only used to purify specific exhaust gases but also has the object to recover the fluorine content of the exhaust gas in such a form that it can be recycled to the electrolytic cell so that less fluorine is required.

In the purification of exhaust gases, however, a recovery of sulfur oxides or other pollutants is usually not required but the laden sorbent is used, e.g., for construction purposes or as packing material in mines or may be discarded.

SUMMARY OF THE INVENTION

It is an object of the present invention to provide a process which does not have the disadvantages of the known gas-purifying processes and can be carried out in a simple manner with highly inexpensive absorbents.

This object is accomplished in that the process of the kind described first hereinbefore is carried out in such a manner in accordance with the invention that the exhaust gas is used as a fluidizing gas and introduced into a fluidized bed which consists of two solid fractions which differ in particle size, namely, a coarse-grained fraction having a particle size $d_p$ 50 in the range of 150 to 500 microns and a fine-grained fraction having a particle size $d_p$ 50 below 10 microns.

Owing to the use of two solid fractions differing in particle size, as is taught by the invention, the residence time of the fine-grained solids in the fluidized bed reactor is substantially increased whereas otherwise the fine-grained solids would be immediately entrained out of the fluidized bed reactor just as in a pneumatic conveyor so that much less desirable conditions with respect to heat- and mass-transfer would be obtained. The relatively coarse particles of the supporting bed material permit a large relative motion between the coarse and fine solids. This results in a mechanical abrasion of the fine solids on the surface which is already occupied by sorption and thus provides a fresh sorptive surface.

The concept of the circulating fluidized bed used according to the invention is distinguished in that, different from the "orthodox" fluidized bed, in which a dense phase is separated by a distinct density step from the overlying gas space, there are states of distribution without a defined boundary layer. There is no density step between a dense phase and an overlying dust space but the solids concentration decreases from bottom to top within the reactor.

The coarse-grained solids which constitute a supporting bed may preferably consist of calcium oxide, calcium hydroxide, calcium carbonate, dolomite, magnesia or magnesium carbonate or of inert materials, such as sand. The ability of the coarser solids to combine with pollutants by sorption is of minor significance.

The fine-grained solids are mainly used to effect the sorption of the pollutants and may consist of the above-mentioned materials, with the exception of sand. Calcium hydroxide is preferably employed. But suitable waste products, such as the red mud which becomes available in the production of hydrated alumina, may also be used.

The fine-grained solids may be fed to the fluidized bed reactor in a solid state or as an aqueous suspension.

In a preferred embodiment of the invention, the fluidized bed contains 70 to 90% by weight coarse solids and 10 to 30% by weight fine solids.

In a preferred embodiment of the invention, the fluidized bed is controlled to maintain such a fluidized state that the following ranges are obtained if the Froude and Achimedes numbers are used.

$$1 \leq \tfrac{3}{4} \times F_r^2 \times \frac{\rho}{\rho_k - \rho_g} \leq 20$$

and $$1 \leq Ar \leq 100$$

where $$Ar = \frac{d_k^3 \times g(\rho_k - \rho_g)}{\rho_g \times \upsilon^2}$$

and $$F_r^2 = \frac{u^2}{g \times d_k}$$

In the above formulas,
u = relative gas velocity in m/sec
Ar = Archimedes number
$F_r$ = Froude number
$\rho g$ = density of gas in kg/m$^3$
$\rho k$ = density of solids particle in kg/m$^3$
$d_k$ = diameter of spherical particle in m
$\nu$ = kinematic viscosity in m$^2$/sec
g = acceleration due to gravity in m/sec$^2$ Since the gas throughput rate and the degree of pollutant removal is dependend on a thorough mixing of solids and gas, the gas velocity in the fluidized bed reactor is suitably adjusted to 1 to 10 m/sec (expressed as the velocity in the empty reactor).

The mean suspension density to be maintained in the fluidized bed reactor can be varied in wide limits, e.g., in the range of 0.1 to 100 kg/m$^3$. It will be particularly desirable to select suspension densities in the lower portion of that range because this will result in a particularly low pressure loss as the exhaust gas flows through the fluidized bed. For this reason, in a preferred embodiment of the invention a mean suspension density of 0.2 to 2 kg/m$^3$ is maintained in the fluidized bed reactor.

In order to ensure a maximum loading of the sorbent with the impurities contained in the exhaust gas and an optimum mixing of solids and gas, another preferred embodiment of the invention comprises adjusting the quantity of solids circulated per hour via fluidized-bed reactor, separator and return line to 20 to 150 times of the quantity of solids contained in the fluidized bed reactor.

The fluidized bed may be circulated through a fluidized bed reactor, a cyclone separator and a return line which leads into the lower portion of the fluidized bed reactor. The cyclone separator serves primarily for the removal of the coarse solids used to form the supporting bed. In dependence on the particle size also certain amounts of fine solids can be separated. In general, for the removal of the fine solids or the rest thereof, the gas stream leaving the cyclone separator is subjected to a fine purification, e.g., by means of an electrostatic precipitator.

According to a particularly preferred embodiment of the invention, the solids entrained with the gases out of the fluidized bed reactor are separated in a directly succeeding electrostatic precipitator. This embodiment has the advantage that the pressure loss of the gas is additionally reduced.

It will be advantageous to use a multiple-field electrostatic precipitator so that the solids entrained by the gases can be separated into particle size fractions and at least the coarser solids fraction collected in the preceding field in the gas flow path can be returned to the fluidized bed whereas the solids collected in the succeeding field in the gas flow path can be removed.

The fluidized bed reactor used to purify exhaust gases may be rectangular, square or circular in cross-section. The gas distributor may consist of a grid provided with nozzles. Particularly if the fluidized bed reactor is large in cross-section and operated with high gas throughput rates, it will be desirable to provide the reactor with a conical lower portion and to inject the exhaust gas through a venturi-like nozzle. The last-mentioned embodiment is advantageous because it involves a particularly low pressure loss and is not susceptible to being plugged and to wear.

The solids can be charged into the fluidized bed reactor in any conventional manner, for instance, through pneumatically operated troughs. If the fine-grained solids are charged in the form of an aqueous suspension, the charging means will preferably consist of lances.

Charging elements are required only in a relatively small number because there is an effective cross-mixing in a circulating fluidized bed.

Dry cleaning can be effected at pressures which may be selected in a wide range, e.g., up to about 25 bars. A superatmospheric pressure will be used particularly if the exhaust gas becomes available under a superatmospheric pressure, e.g., because the exhaust gas producing process is operated under a superatmospheric pressure. In general, however, the exhaust gas will be purified under a pressure of about 1 bar.

The temperature of the exhaust gases to be purified by the process according to the invention can be selected in a wide range so that the exhaust gases may be charged into the fluidized bed reactor virtually at the temperature at which they become available. To eliminate the need of using heat-resisting materials or specific cooling systems for the means for charging the fluidized bed reactor, it is desirable to use temperatures not in excess of 550° C.

All exhaust gas which becomes available or only a partial stream of said exhaust gas can be purified by the process according to the invention. The process according to the invention can be combined with wet scrubbing processes. Such a parallel arrangement will afford the advantage that it is no longer necessary to reheat the purified gases in order to avoid temperatures below the dew point or a trail of smoke from the chimney, as is required in connection with wet scrubbing processes.

The process according to the invention is of universal utility and is particularly suitable for purifying flue gases from power plant furnaces or refuse-incinerating plants or of exhaust gases generated in the aluminum-processing industry or in the glass and ceramics industries. The process according to the invention may also be used to purify gases which become available in gasifying processes. Particularly sulfur oxides, hydrogen chloride, hydrogen fluoride or compounds thereof can be removed.

The advantages afforded by the process according to the invention reside in that it can be operated behind existing plants without any alteration or with only minor alterations thereof, that it can be combined as necessary with any other form of gas purification, that there is no need for an aftertreatment of the purified gas and that very high exhaust gas throughput rates per unit of area of the fluidized bed reactor are possible. Because a large quantity of sorbent is circulated the circulating fluidized bed has the capability of sorbing high quantities of polluant and therefore the process can be used for a reliable purification of gases without a high expenditure for automatic control even if the polluant contents of the exhaust gases vary greatly. Because the supporting bed is provided, there will be no risk of adhesion or caking if the fine-grained solids used as a sorbent are charged in the form of a suspension. The process according to the invention permits an almost complete utilization of the fine-grained solids used as a sorbent and results in purified gases having extremely low polluant contents.

The various features of novelty which characterize the invention are pointed out with particularity in the claims annexed to and forming a part of this specification. For a better understanding of the invention, it operating advantages and specific objects obtained by its use, refernce should be had to the accompanying drawings and descriptive matter in which there is illustrated and described a preferred embodiment of the invention.

BRIEF DESCRIPTION OF THE DRAWINGS

The drawing is a diagrammatic view of the circulating fluidized bed system.

DESCRIPTION OF THE PREFERRED EMBODIMENT

The exhaust gas to be purified is charged into the fluidized bed reactor 2 through the conical lower portion 1, which is provided with a venturi nozzle. Coarse-grained solids used as supporting bed material are supplied through line 3 and fine-grained solids used as sorbent are supplied through line 4. The resultant solids-gas suspension leaves the fluidized bed reactor 2 through conduit 14 and enters the two-field electrostatic precipitator 5, in which the solids are collected. The coarse-grained fraction is collected in the dust bin 6 and is returned via conduit 7 to the fluidized bed reactor 2. The fine-grained fraction collected in the dust bin 8 is discharged through line 9. The purified flue gas is conducted through line 10 to the chimney.

EXAMPLE

The exhaust gas to be purified became available in a refuse-incinerating plant at 220° C. at a rate of 100,000 cubic meters (STP) per hour. The exhaust gas had the following contents per $m^3$ (STP)

| HCl | 1.5 g |
| SO$_2$ | 1 g |
| HF | 0.025 g |
| Ash | 3.5 g |

The cylindrical portion of the fluidized bed reactor which was employed was 3.5 m in diameter and had a height of 14 m.

The exhaust gas was fed to the fluidized bed reactor 2 through the device 1, which was similar to a venturi tube. Dolomite having a particle size $d_p$ 50=250 microns was supplied through line 3 at a rate of 0.36 kg/h and calcium hydroxide having a particle size $d_p$ 50=8 microns was supplied through line 4 at a rate of 360 kg/h.

In the fluidized bed reactor 2 the gas velocity amounted to 5.5 m/sec and the mean suspension density to about 0.4 kg/$m^3$.

The solids-gas suspension leaving the fluidized bed reactor 2 at its top through conduit 14 had a suspension density of 400 g/$m^3$ (STP) and entered the two-field electrostatic precipitator 5. Solids at a rate of 39.12 metric tons per hour were collected in the dust bin 6 and were entirely recycled through conduit 7 to the lower portion of the fluidized bed reactor 2. Solids at a total rate of 872 kg/h were collected in dust bin 8 and consisted of a mixture of ash introduced by the combustion gases of the refuse-incinerating plants and particularly of calcium chloride, calcium fluoride, calcium sulfate, calcium sulfite, also unreacted dolomite and unreacted calcium hydroxide.

The exhaust gas discharged through line 10 had the following contents per cubic meter (STP):

| HCl | 10 mg |
| SO$_2$ | 100 mg |
| F | 0.3 mg |
| dust | 10 mg |

It will be understood that the specification and examples are illustrative but not limitative of the present invention and that other embodiments within the spirit and scope of the invention will suggest themselves to those skilled in the art.

Instead of introducing the solids-gas suspension leaving the fluidized bed reactor 2 into a two-field electrostatic precipitator, the suspension may also be introduced into a mechanical separator, e.g. a cyclone separator, which is succeeded by a one-field electrostatic separator. In that case the coarse particle fraction separated in the mechanical separator in a rate of 39,12 metric tons per hour is recycled to the fluidized bed reactor 2. The solids collected in the electrostatic separator in a rate of 872 kg/h are of the same composition as mentioned above.

We claim:

1. A process for removal of pollutants of the group consisting of $SO_x$, HCl, HF and $H_2S$ from an exhaust gas by means of solids circulating in a circulating system formed by a fluidized bed reactor, a separator and a return line comprising introducing the polluted exhaust gas into said fluidized bed reactor to fluidize the bed therein, said bed consisting of two solid fractions, the first fraction having a particle size $d_p$ 50 in the range of 150 to 500 microns and the second fraction having a particle size $d_p$ 50 below 10 microns, collecting solids entrained by the gas in separate particle size fractions and returning at least the coarser solid fraction into said fluidized bed reactor.

2. A process according to claim 1, wherein CaO, $CaCO_3$, MgO, $MgCO_3$, dolomite and/or sand is used as the first fraction of solids.

3. A process according to claim 1, wherein $Ca(OH)_2$ is used as the second fraction of solids.

4. A process according to claim 1, wherein the fluidized bed is controlled to contain 70 to 90% by weight of the first fraction of solids and 10 to 30% by weight of second fraction of solids.

5. A process according to claim 1, wherein a fluidized state in the fluidized bed reactor, as defined by the Froude and Archimedes numbers, is adjusted according to:

$$1 \leq \frac{3}{4} \cdot F_r^2 \cdot \frac{\rho}{\rho_k - \rho_g} \leq 20$$

and $$1 \leq Ar \leq 100$$

6. A process according to claim 1, wherein a gas velocity of 1 to 10 m/sec (stated as the velocity in the empty reactor) is maintained in the fluidized bed reactor.

7. A process according to claim 1, wherein a mean suspension density of 0.2 to 2 $kg/m^3$ is maintained in the fluidized bed reactor.

8. A process according to claim 1, wherein the quantity of solids circulated per hour is adjusted to 20 to 150 times the quantity of solids contained in the fluidized bed reactor.

9. A process according to claim 1, wherein the solids entrained by the gases are removed in an electrostatic precipitator.

10. A process according to claim 9, wherein the solids entrained by the gases are collected in a multi-field electrostatic precipitator in separate particle size fractions and at least the coarse fraction of solids collected in the first field are returned to the fluidized bed reactor.

11. A process according to claim 10, wherein the second fraction of solids collected are removed.

12. A process according to claim 1, wherein the solids in the gas discharged from the fluidized bed reactor are recirculated in a separator and a return line therefrom into said reactor.

* * * * *